Figures 1, 2:
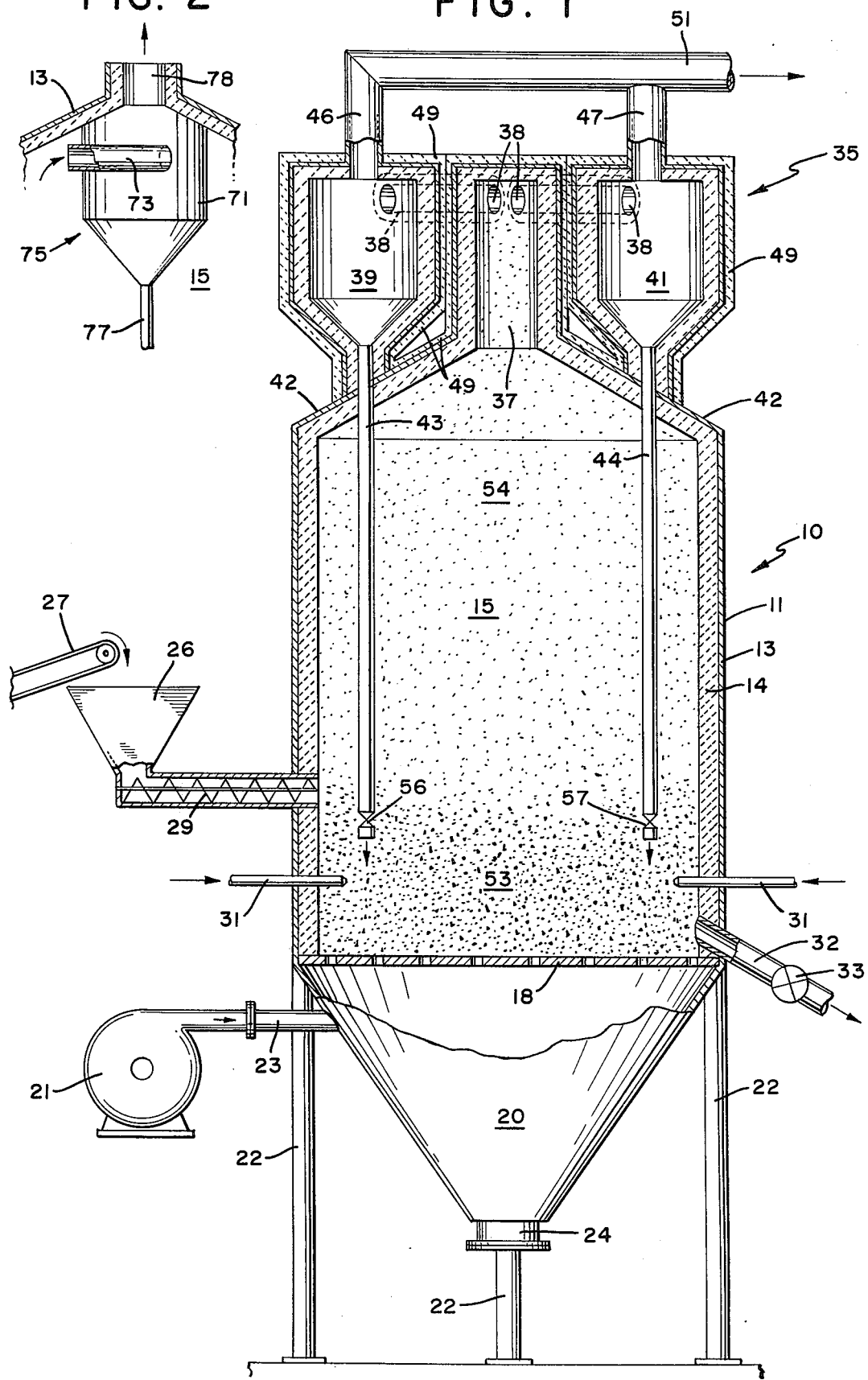

United States Patent [19]

Priestley

[11] 4,021,184

[45] May 3, 1977

[54] DILUTE PHASE WASTE INCINERATOR

[75] Inventor: Robert Joseph Priestley, Westport, Conn.

[73] Assignee: Dorr-Oliver Incorporated, Stamford, Conn.

[22] Filed: Oct. 2, 1975

[21] Appl. No.: 619,102

[52] U.S. Cl. .................................. 431/7; 110/28 J; 110/8 F; 431/170
[51] Int. Cl.² ....................................... F23D 19/00
[58] Field of Search ............. 431/7, 170; 110/28 J, 110/8 F; 432/58; 34/57 A

[56] References Cited
UNITED STATES PATENTS

| | | |
|---|---|---|
| 3,589,313 | 6/1971 | Furlong et al. ..................... 110/8 F |
| 3,769,922 | 11/1973 | Furlong et al. ..................... 110/8 F |
| 3,921,544 | 11/1975 | Reese ................................. 110/8 F |
| 3,941,065 | 3/1976 | Albrecht ............................ 110/8 F |

Primary Examiner—Edward G. Favors
Attorney, Agent, or Firm—H. M. Snyder; Burtsell J. Kearns; Theodore M. Jablon

[57] ABSTRACT

A fluidized bed waste incinerator is operated with a space rate such that essentially the entire reactor chamber is occupied by a dilute fluidized bed. Particulate solids elutriated with the exhaust gases are returned to the reactor chamber to thereby conserve the heat generated in the reactor chamber.

6 Claims, 2 Drawing Figures

U.S. Patent May 3, 1977 4,021,184

DILUTE PHASE WASTE INCINERATOR

This invention is directed to a novel method of operating a fluid bed incinerator to carry out the incineration of waste matter.

Fluid bed reactors have in recent years been applied to the incineration of waste matter, including sewage sludge. While there are a number of example of operating units carrying out the incineration of waste matter, the procedure has certain operating problems which have thus far resisted proposed solutions.

One such problem is the phenomenon known as freeboard buring in which particles of waste matter, though introduced into the fluidized bed, are ejected upward into the freeboard space and there further combustion takes place with the result that excessive temperatures occur within this freeboard region. The temperatures in the freeboard region often exceed 1500° F, which is substantially in excess of the temperature required to carry out the incineration operation. Economies in construction materials and in fuel can be realized by operating at lower temperatures. Ideally, the combustion would all take place within the fluidized bed, the highest temperatures reached in the fluid bed reactor would be within the fluidized bed and only gaseous products would leave the reactor chamber, with any odorous constituents in the waste matter entirely destroyed by exposure to the elevated temperatures for a substantial length of time.

The term "space rate" as employed in this description is defined as the velocity of the rising gases in the reaction chamber with the assumption that the reaction chamber is not occupied by fluidized material. The space rate is expressed as follows:

$$\text{Space Rate in ft/sec} = \frac{\text{Total Gas Volume in cu.ft/sec}}{\text{Cross-sectional Flow Area in sq.ft}}$$

A novel method for operating a fluid bed waste incinerator has now been provided wherein the problem of free board burning has been overcome.

It is an object of this invention to provide an improved fluid bed waste incineration process.

It is a further object of this invention to provide a novel fluid bed waste incineration system in which combustion is conducted in a dilute phase fluidized bed.

Other objects and advantages will become apparent from the following description taken in conjunction with the accompanying drawings in which:

FIG. 1 is an elevational view, partially in section, of a fluid bed waste incinerator especially adapted to carry out the process of the present invention and FIG. 2 is a fragmentary view of a fluid bed waste incinerator showing a modified cyclone arrangement.

Generally speaking, the incineration process of the present invention comprises establishing a dilute phase fluidized bed which substantially entirely fills the fluid bed reactor vessel and carrying out the combustion in the dilute phase bed.

More particularly, the dilute phase fluidized bed is established by employing a space rate which is substantially higher than that normally applied in fluid bed incineration. Thus, whereas the usual space rate is to be found in the range from 2 to 3 feet per second, the novel process of the invention would be conducted using a space rate of at least about 4 ft/sec, say in the range of from about 4 to 20 feet per second and, preferably, in the range of from about 8 feet per second. Since the dilute phase present in the reactor chamber will result in large amounts of fines being swept out of the reactor chamber with the exhaust gases, the process must include the recycle of those solids to conserve heat in the fluid bed reactor. If this is not done the operation becomes uneconomic.

The apparatus for carrying out the process of this invention provides for recycle of elutriated solids and disposal of the exhaust gases. The particulate solids carried out with the exhaust gases are returned by means of a cyclone separator. The cyclone arrangement is such as to minimize the loss of heat during the desired separation. Thus, the cyclones are located close to or within the fluid bed reactor. If exterior cyclones are used, the exhaust conduit from the reactor and the return conduits from the cyclones for particulate solids are as short as possible and the exposed conduits and the cyclones proper are provided with the blanket of heat insulating material.

Referring now to the drawings, FIG. 1 illustrates a fluid bed reactor which incorporates a suitable exhaust gas and solids recycle system 35 for carrying out the process of the present invention. Thus, the fluid bed reactor 10 has a vessel wall 11 which comprises a steel shell 13 and a refractory lining 14. A blower 21 supplies air to the windbox 20 through the air inlet conduit 23 and the windbox 20 is provided with a cleanout port 24. In order to feed the waste material into the reactor chamber 15, a feed hopper 26 is positioned to receive a feed from endless belt 27. At the lower end of feed hopper 26 a screw feed mechanism 29 is provided extending through the vessel wall 11. A plurality of fuel guns 31 also penetrate the vessel wall 11 for furnishing fuel to the reactor chamber 15. An underflow solids conduit 32 also communicates with the reaction chamber 15 through vessel wall 11 for the purpose of removing excess coarse solids from the reaction chamber and the conduit 32 is controlled by a valve 33. The fluid bed reactor 10 is supported above ground level by legs 22.

The exhaust gas and solids recycle system 35 mounted on top of the fluid bed reactor 10 comprises a pair of cyclones 39, 41, each with its solids discharge conduit 43 and 44, respectively, and its gas conduit 46 and 47, respectively. The exhaust conduit 37 leading from the reaction chamber 15 communicates with cyclone inlets 38. The cyclone solids discharge conduits 43 and 44 penetrate the reactor roof 42 and extend well into the reaction chamber 15. The lower end of the solids discharge conduits may be provided with trickle valves 56, 57, if desired. The cyclone gas conduits 46 and 47 communicate with the system exhaust conduit 51. The reactor exhaust conduit 37, the cyclones 39 and 41 and that portion of the solids discharge conduits 43 and 44 which are external of the fluid bed reactor 10 are covered with an insulating material or blanket 49.

In operation it will be understood that a body of inert particles, for example, sand having a particle size in the range from −10 to +100 mesh will be provided in the reaction chamber 15 resting on the constriction plate 18. The blower is operated to fluidize the sand bed and fuel is introduced by means of the fuel guns 31 and the fuel is ignited. When the operating temperature is reached, say in the range from 1200° to 1400°F, introduction of the feed, for example, sewage sludge, is begun. With the introduction of the feed material the space rate within the reaction chamber 15 is raised to a range above 4 feet per second which produces within the reaction chamber what is termed a dilut fluidized bed. In general, this means that fine particles in the fluided are are elutriated from the original bed and substantially fill the former freeboard region of the reaction chamber. The coarser material in the sand bed will be less affected than the finer particles and so a situation is created in which a somewhat denser fluidized bed remains in the lower portion of the reaction chamber, while a more dilute fluidized bed occupies the upper regions of the reaction chamber. This has been illustrated in FIG. 1 by a rather clear separation between the more dilute fluidized bed 54 and the denser fluidized bed 53, but it will be understood that, in actual fact, there will be an imperceptible gradation from the denser fluidized bed in the lower region of the reaction chamber 15 to the more dilute fluidized bed in the upper regions of the reaction chamber. 15. While we refer to "denser" and "more dilute", it will be understood that the fluidized bed within the reaction chamber 15 is everywhere more dilute than would be experienced in normal fluidized bed operation. Thus, it is entirely accurate to speak of a dilute fluidized bed as applicable to the entire operation in accordance with this invention, always recognizing that some portions of the bed are more dilute than others. In this connection then, the lower portion of the reaction chamber may have a relatively dense bed, say 60 lbs. per cubic foot thereof, whereas the most dilute phase in the upper portion of the reaction chamber will have a density of, say, 20 lbs, per cubic foot.

With the high space rate within the reaction chamber 15, it will be appreciated that large amounts of solid particulate matter are unavoidably carried out with the exhaust gases. The solids in the exhaust gases (sand particles and ash), if merely disposed of, would carry away a great deal of heat from the reactor vessel and this heat loss would render the operation uneconomic. Thus, the gases with the solids carried therein are conducted to a pair of cyclones 39 and 41 for separation of the gas from the solids. The solids from the cyclone separation are returned to the reaction chamber 15 through the cyclone solids discharge conduits 43 and 44 and thereby the heat contained therein is largely conserved. The gases leave through the conduits 46, 47 and 51 for further treatment and/or disposal. It is also possible to pass these gases through a heat exchanger to thereby heat the gases introduced through conduit 23 to further conserve the heat. The cyclones 39 and 41 and their associated conduits 37, 43 and 44, if exposed to ambient air, conduct and radiate away large amounts of heat because they have a large surface area. It is therefore highly desirable that the conduits be constructed so as to be as short as possible and that both conduits and cyclones be insulated, and for that reason they are provided with the insulating blanket 49.

The feed introduced through the feed screw 29 tends to move first to the lower portion of the reaction chamber, particularly if it has a wet and sticky consistency. As this waste material dries in the fluidized bed, it breaks apart and elutriates under the influence of the high space rate, bringing about combustion of the waste material throughout the reaction chamber. Thus, combustion takes place in essentially all regions of the dilute phase fluidized bed present in the reaction chamber. Due, however, to the characteristics of fluidized beds and to the large inventory of solids in the reaction chamber in accordance with this invention, the temperature in the reaction chamber tends to remain quite uniform and is in the range from 1200° to 1400° F throughout the reaction chamber 15, thus insuring complete combustion and destruction of odorous constituents.

While the exhaust gas and solids recycle system is shown in FIG. 1 as mounted on the roof of the reactor, it may, alternatively, be mounted at the side of the reactor, always taking care to provide short conduits and sufficient insulation. Further, an interior cyclone, as illustrated in FIG. 2 may be substituted for exterior cyclones. In FIG. 2 cyclone gas inlet 73 receives the gases from the reaction chamber 15, solids are returned to the fluidized bed through solids outlet 77 and exhaust gases expelled through exhaust conduit 78. An interior cyclone of this type must, of course, be fabricated from high temperature alloys.

There has thus been disclosed a novel process for conducting waste incineration.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In an incineration process conducted in a fluid bed reactor to destroy organic waste material, the steps of fluidizing a bed of inert particulate solids at a space rate of at least about 4 ft./sec. to entirely fill said reactor with a dilute phase fluidized bed, maintaining said fluidized bed at a temperature of at least about 1200°F, introducing said organic waste material into said fluidized bed to burn the organics, essentially completely burning said organic waste material within said reactor, elutriating a substantial amount of bed fines and ash with the exhaust gases from said reactor, separating the solids from the gases in said exhaust gases while minimizing heat loss and returning said hot separated solids directly to the bed thereby conserving the heat generated in said reactor.

2. A process for the incineration of organic waste matter comprising establishing a fluidized bed of inert particles in a suitable combustion chamber, supplying a flow of combustion air through said fluidized bed at a space rate sufficiently high to entirely fill said combustion chamber with a dilute phase fluidized bed, said dilute phase fluidized bed ranging in density from about 20 lbs./cu. ft. in the upper region thereof up to about 60 lbs./cu. ft. in the lower region thereof, maintaining said fluidized bed at a temperature of at least about 1200°F, feeding said organic waste material into said dilute phase fluidized bed to subject the organic material to combustion, elutriating substantial amounts of hot solids comprised of bed material and ash with the exhaust combustion gases, separating hot solids from said exhaust gases and promptly returning said separated solids to the dilute phase fluidized bed thereby conserving the heat contained in said solids.

3. The incineration process of claim 2 wherein said space rate is in the range from about 4 ft./sec. up to about 20 ft./sec.

4. In an incineration process conducted in a fluid bed reactor to destroy organic waste material, the steps of fluidizing a bed of inert particulate solids at a space rate in the range from about 4 ft./sec. up to about 20 ft./sec. to substantially entirely fill said reactor with a dilute phase fluidized bed, maintaining said fluidized bed at a temperature in the range from about 1200° up to about 1400° F, introducing said organic waste material into said fluidized bed to burn the organics, elutriating a substantial amount of bed fines and ash with the exhaust gases from said reactor, separating the solids from the gases in said exhaust gases while minimizing heat loss and returning said hot separated solids to the bed thereby conserving the heat generated in said reactor.

5. The incineration process of claim 4 wherein the density of said dilute phase fluidized bed is at least about 20 lbs./cu.ft.

6. The incineration process of claim 5 wherein the density of said dilute phase fluidized bed varies from about 20 lbs.cu.ft. in an upper region of said fluidized bed to about 60 lbs./cu.ft. in a lower region of said fluidized bed.

* * * * *